(12) United States Patent
Ito (10) Patent No.: US 8,181,633 B2
(45) Date of Patent: May 22, 2012

(54) INTAKE MANIFOLD

(75) Inventor: Atsushi Ito, Anjo (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 0 days.

(21) Appl. No.: 13/120,345

(22) PCT Filed: Nov. 26, 2009

(86) PCT No.: PCT/JP2009/069966
§ 371 (c)(1),
(2), (4) Date: Mar. 22, 2011

(87) PCT Pub. No.: WO2010/071013
PCT Pub. Date: Jun. 24, 2010

(65) Prior Publication Data
US 2011/0174279 A1 Jul. 21, 2011

(30) Foreign Application Priority Data
Dec. 17, 2008 (JP) .................................. 2008-320672

(51) Int. Cl.
*F02M 25/07* (2006.01)
*F02B 47/08* (2006.01)

(52) U.S. Cl. ............................... 123/568.18; 123/568.17

(58) Field of Classification Search ............. 123/568.18, 123/568.17, 568.23, 568.21, 306, 399, 184.61; 701/108; 60/605.1, 605.2
See application file for complete search history.

(56) References Cited

U.S. PATENT DOCUMENTS

| | | | |
|---|---|---|---|
| 4,856,473 A * | 8/1989 | Kawai et al. ................... | 123/308 |
| 5,273,014 A | 12/1993 | Mitobe et al. | |
| 6,138,651 A * | 10/2000 | Mori et al. ................ | 123/568.17 |
| 6,799,560 B2 * | 10/2004 | Kojima et al. ................ | 123/491 |
| 2006/0249115 A1 * | 11/2006 | Hashimoto et al. ...... | 123/184.55 |
| 2009/0293831 A1 | 12/2009 | Harada | |

FOREIGN PATENT DOCUMENTS

| | | |
|---|---|---|
| DE | 10 2009 026 482 A1 | 12/2009 |
| EP | 0 809 012 A2 | 11/1997 |
| EP | 2 131 024 A2 | 12/2009 |
| FR | 2 902 152 A1 | 12/2007 |

(Continued)

OTHER PUBLICATIONS

International Search Report (PCT/ISA/210) issued on Dec. 22, 2009, by Japanese Patent Office as the International Searching Authority for International Application No. PCT/JP2009/069966.

(Continued)

*Primary Examiner* — Mahmoud Gimie
(74) *Attorney, Agent, or Firm* — Buchanan Ingersoll & Rooney PC (57) ABSTRACT

An intake manifold includes: an EGR inlet for discharging exhaust recirculation gas toward a cylinder side; and a tumble control valve switchable between an open position and a close position, and has an indentation forming a gap between the tumble control valve and an inner wall of the intake line when the tumble control valve is in the close position. When the intake manifold is assembled to the internal combustion engine, in the open position and in the close position of the tumble control valve, any perpendicular line extending downward from the EGR inlet is out of intersection with the tumble control valve, and at the same time, in at least one of the open position and the close position of the tumble control valve, a perpendicular line extending downward from a most upstream portion of the EGR inlet in an intake direction intersects an area of the indentation.

10 Claims, 6 Drawing Sheets

FOREIGN PATENT DOCUMENTS

| | | |
|---|---|---|
| JP | 7-103082 A | 4/1995 |
| JP | 8-326597 A | 12/1996 |
| JP | 9-195860 A | 7/1997 |
| JP | 10-213019 A | 8/1998 |
| JP | 10-274104 A | 10/1998 |
| JP | 2004-301002 A | 10/2004 |
| JP | 2005-83312 A | 3/2005 |
| JP | 2006-97522 A | 4/2006 |
| JP | 2008-128180 A | 6/2008 |

OTHER PUBLICATIONS

Written Opinion (PCT/ISA/237) issued on Dec. 22, 2009, by Japanese Patent Office as the International Searching Authority for International Application No. PCT/JP2009/069966.

Official Action dated May 26, 2011, issued by the Japanese Patent Office in corresponding Japanese Patent Application No. 2010-542929, and English language translation of the Official Action.

Notification of Transmittal of Translation of the International Preliminary Report on Patentability (Form PCT/IB/338) dated Jul. 14, 2011, International Preliminary Report of Patentability (Form PCT/IB/373) and Written Opinion of the International Searching Authority (Form PCT/ISA/237) dated Jul. 5, 2011, issued in corresponding International Patent Application No. PCT/JP2009/069966.

Extended European Search Report issued on Aug. 24, 2011 by the European Patent Office in corresponding European Patent Application No. 09 83 3318.

* cited by examiner

INTAKE MANIFOLD

TECHNICAL FIELD

The present invention relates to an intake manifold with an EGR inlet and a tumble control valve.

BACKGROUND ART

Conventionally, it has been known that exhaust recirculation gas (hereinafter, referred to as "EGR gas") is introduced to an intake line of an internal combustion engine, to reduce an amount of nitrogen oxide (NOx) in exhaust gas. When nitrogen is heated to very high temperatures, it is oxidized into toxic nitrogen oxide. However, the introduction of the EGR gas to the intake line leads to a reduction in an oxygen concentration in intake air and thus gentle combustion of fuel, and also to an increase in a concentration of carbon dioxide which is difficult to heat as compared with oxygen. As a result, a combustion temperature is not likely to be raised, and generation of nitrogen oxide can be suppressed.

It has been also known that, in a case where a tumble control valve is provided in the intake line, when the intake line is narrowed by the tumble control valve during idling or the like where an intake air stream is slow, an intake air speed is increased and generation of a tumble flow (vortex) in the cylinder, as well as atomization of the fuel, is promoted. It is said that, as a result, a mixing rate of the fuel and the intake air becomes high and thus combustion efficiency of the internal combustion engine is enhanced.

For example, there can be mentioned a technique in which a cylinder head of an engine is provided with the tumble control valve, and an EGR opening is formed somewhat downstream of the tumble control valve (see Patent Documents 1 and 2). According to this technique, while the effect of the EGR gas and the effect of the tumble control valve as described above are obtained, foreign materials, such as carbon, contained in the EGR gas is prevented from attaching to the tumble control valve. Therefore, an abnormal operation of the tumble control valve, which may otherwise be caused by an increase in a rotational resistance, is prevented. In addition, carbon and the like does not attach to an inner wall of the intake line around the tumble control valve, and a strength of the tumble flow does not become unstable, which may otherwise be caused by a change in an amount of the intake air leaking from the valve upon the generation of the tumble flow. Therefore, a reduction in the combustion efficiency of the engine can be suppressed.

In addition, according to the technique of Patent Document 1, by arranging an EGR inlet in the vicinity of the tumble control valve, the EGR gas is carried about by the tumble flow and effectively flows into the cylinder. It is said that, with this confirmation, the EGR gas is present in the cylinder in such a manner that it surrounds a mixed gas of the intake air and the fuel, and because of a heat insulating effect of the EGR gas, a cooling loss of the combustion temperature can be suppressed.

CITATION LIST

Patent Document
Patent Document 1: Japanese Unexamined Patent Application Publication No. 2008-128180
Patent Document 2: Japanese Unexamined Patent Application Publication No. 10-274104

SUMMARY OF INVENTION

Technical Problem

Since the cylinder head of the engine is typically made of metals, for providing the intake line of the cylinder head with the EGR inlet and the tumble control valve as in the technique of Patent Document 1 and 2, time and effort are required for processing and assembling the product, leading to a cost increase. Further, for replacing the tumble control valve and cleaning a part around the EGR inlet, much time and effort are required, and thus a problem of poor maintainability arises.

On the other hand, from a viewpoint of cost saving, it has been demanded that the intake manifold is made of resin for facilitating a fabrication of the intake manifold, and that the EGR inlet and the tumble control valve are provided in the intake manifold. Since the EGR inlet should be arranged downstream in an intake direction relative to the tumble control valve, the tumble control valve cannot be arranged most downstream of the intake manifold in the intake direction. Therefore, the tumble control valve and the cylinder should be arranged away from each other, and the tumble flow is decreased due to a pipe resistance, leading to a problem of difficulty in maintaining a proper tumble flow. As described above, there have been problems in obtaining the intake manifold made of resin and in providing the EGR inlet and the tumble control valve to the intake manifold.

In view of the above, an object of the present invention is to provide an intake manifold made of resin which realizes an appropriate introduction of the EGR gas and an appropriate action of the tumble control valve.

Solution to Problem

In a first aspect of the intake manifold according to the present invention, an intake manifold which is made of resin and configured to be connected to an intake port of a cylinder of an internal combustion engine includes: an EGR inlet for discharging exhaust recirculation gas toward a cylinder side; and a tumble control valve which is switchable between an open position in which an intake line to the cylinder is opened and a close position in which the intake line is closed, and has an indentation that forms a gap between the tumble control valve and an inner wall of the intake line when the tumble control valve is in the close position, the intake manifold being configured so that, when the intake manifold is assembled to the internal combustion engine, in the open position and in the close position of the tumble control valve, any perpendicular line extending downward from the EGR inlet is out of intersection with the tumble control valve, and at the same time, in at least one of the open position and the close position of the tumble control valve, a perpendicular line extending downward from a most upstream portion of the EGR inlet in an intake direction intersects an area of the indentation.

According to the present configuration, the intake manifold which is made of resin and configured to be connected to the intake port of the cylinder of the internal combustion engine includes: the EGR inlet for discharging the exhaust recirculation gas toward the cylinder side; and the tumble control valve switchable between the open position in which the intake line is opened and the close position in which the intake line is closed.

Since the intake manifold is made of resin, even those having a complicated shape can be easily fabricated by injection molding or the like. Since processing of an assembly portion of the tumble control valve, the EGR inlet and the like is facilitated, and assembly of the tumble control valve is facilitated as compared with a case where the EGR inlet and the tumble control valve are provided in a metallic cylinder head. As a result, assembly accuracy is enhanced, which in turn enhances operating accuracy of the tumble control valve. In addition, a production cost can be suppressed.

In addition, in the open position and in the close position of the tumble control valve, any perpendicular line extending downward from the EGR inlet is out of intersection with the tumble control valve, and thus even if exhaust condensate is generated around the EGR inlet, the exhaust condensate is prevented from dropping on the tumble control valve. Therefore, problems including oxidative corrosion of the tumble control valve and inoperative of the tumble control valve due to freeze in cold regions can be suppressed.

Moreover, the tumble control valve has the indentation that forms the gap with the inner wall of the intake line when the tumble control valve is in the close position, and in at least one of the open position and the close position of the tumble control valve, the perpendicular line extending downward from the most upstream portion of the EGR inlet in the intake direction intersects the area of the indentation. Accordingly, while the EGR inlet is arranged downstream of the tumble control valve, the tumble control valve can be disposed most downstream of the intake manifold in the intake direction. Therefore, while realizing an effect of lowering the amount of nitrogen oxide by introducing the EGR gas and an effect of enhancing the combustion efficiency of the internal combustion engine by the tumble control valve, a distance between the tumble control valve and the cylinder can also be made short, and a decrease in an intake air speed due to a pipe resistance can be suppressed.

In a second aspect of the intake manifold according to the present invention, the intake manifold further includes an EGR surge tank for storing the exhaust recirculation gas.

With this configuration, unlike a case where the EGR surge tank is provided separately from the intake manifold, a connecting pipe or the like for connecting the EGR surge tank and the EGR inlet is unnecessary, thus making the intake manifold compact. In addition, since the EGR surge tank can be integrally formed with the intake manifold, a fabrication step of the EGR surge tank is unnecessary, and thus the production cost is reduced.

In a third aspect of the intake manifold according to the present invention, an intake manifold which is made of resin and configured to be connected to an intake port of a cylinder of an internal combustion engine includes: an EGR inlet for discharging exhaust recirculation gas toward a cylinder side, the EGR inlet protruding to the cylinder side from an outlet port connected to the intake port; and a tumble control valve which is switchable between an open position in which an intake line to the cylinder is opened and a close position in which the intake line is closed.

As in the present configuration, since the intake manifold made of resin is provided with the tumble control valve, the assembly of the tumble control valve is facilitated, the assembly accuracy of the tumble control valve is enhanced, and thus the operating accuracy of the tumble control valve is enhanced. In addition, processing of the assembly portion of the tumble control valve is facilitated, and the production cost can be suppressed as compared with a case where the EGR inlet and the tumble control valve are provided in the cylinder head.

Moreover, since the EGR inlet protrudes from the outlet port to the cylinder side, the tumble control valve is positioned upstream of the EGR inlet, regardless of the position of the EGR inlet. In other words, the tumble control valve can be disposed closer to a most downstream portion of the intake manifold in the intake direction. Therefore, the distance between the tumble control valve and the cylinder can also be made short, and a decrease in the intake air speed due to the pipe resistance can be suppressed.

In a fourth aspect of the intake manifold according to the present invention, in at least one of the open position and the close position of the tumble control valve, a portion of the tumble control valve protrudes from the outlet port to the cylinder side, and when the intake manifold is assembled to the internal combustion engine, in the open position and in the close position of the tumble control valve, any perpendicular line extending downward from the EGR inlet is out of intersection with the tumble control valve.

As in the present configuration, since a portion of the tumble control valve protrudes to the cylinder side from the outlet port connected to the intake port in at least one of the open position and the close position of the tumble control valve, while a positional relationship in the intake direction between the EGR inlet and the tumble control valve is retained, the tumble control valve can be arranged further close to the most downstream portion of the intake manifold in the intake direction to a degree that a rotational axis of the tumble control valve is just enough to be located in the intake manifold. In addition, since the intake manifold is configured in such a manner that, in the open position and in the close position of the tumble control valve, any perpendicular line extending downward from the EGR inlet is out of intersection with the tumble control valve, even if the exhaust condensate is generated around the EGR inlet, the exhaust condensate is prevented from dropping on the tumble control valve.

In a fifth aspect of the intake manifold according to the present invention, the tumble control valve has an indentation that forms a gap between the tumble control valve and an inner wall of the intake line when the tumble control valve is in the close position, and an EGR passage that connects an EGR surge tank for storing the exhaust recirculation gas and the EGR inlet runs through the gap when the tumble control valve is in the close position.

As in the present configuration, the EGR passage that connects the EGR surge tank for storing the exhaust recirculation gas and the EGR inlet runs through the gap between the indentation formed in the tumble control valve and the inner wall of the intake line, even when the tumble control valve is in the close position. Accordingly, even when the EGR passage is arranged inward in a radial direction of the outlet port, the tumble control valve bridges over the EGR passage with the EGR passage positioned within the indentation, in the close position of the tumble control valve. Accordingly, the tumble control valve never comes into contact with the EGR passage, and a posture change action of the tumble control valve is never hindered. Therefore, without changing a shape of the intake port on the cylinder side, the EGR inlet can protrude to an intake port side, and thus wide variety of the internal combustion engine to which the intake manifold according to the present invention is applicable can be used.

In a sixth aspect of the intake manifold according to the present invention, an EGR passage that connects an EGR surge tank for storing the exhaust recirculation gas and the EGR inlet is formed outward in a radial direction of the outlet port and arranged in parallel with the intake line.

As in the present configuration, since the EGR passage is formed outward in the radial direction of the outlet port and arranged in parallel with the intake line, the EGR passage is not located inward in the radial direction of the outlet port. In other words, the EGR passage is located outward of an area of the intake line as viewed in cross section. Therefore, regardless of a position and a shape of the tumble control valve, the tumble control valve never comes into contact with the EGR passage, and the posture change action of the tumble control valve is never hindered. In this case, by expanding a diameter of a portion of the intake line on the cylinder side where the EGR inlet is open, the EGR inlet never protrudes inward in the radial direction of the intake line. In addition, since less irregularity is present inside the intake line, a circulation of the intake air is not hindered, the generation of the turbulent flow is reduced, and the intake air can be efficiently sent to the cylinder.

In a seventh aspect of the intake manifold according to the present invention, an EGR passage that connects an EGR surge tank for storing the exhaust recirculation gas and the EGR inlet protrudes inward in a radial direction of the intake line.

With this configuration, the EGR passage protrudes inward in the radial direction of the intake line. Therefore, without changing the shape of the intake port on the cylinder side, the EGR inlet can protrude to the intake port side, and thus wide variety of the internal combustion engine to which the intake manifold according to the present invention is applicable can be used.

In an eighth aspect of the intake manifold according to the present invention, an EGR passage that connects an EGR surge tank for storing the exhaust recirculation gas and the EGR inlet is provided outside the intake line.

As in the present configuration, since the EGR passage is provided outside the intake line, the EGR passage is not located inward in the radial direction of the outlet port. In other words, the EGR passage is located outward of an area of the intake line as viewed in cross section. Therefore, regardless of the position and the shape of the tumble control valve, the tumble control valve never comes into contact with the EGR passage, and the posture change action of the tumble control valve is never hindered. In addition, since less irregularity is present in the intake line, the circulation of the intake air is not hindered, the generation of the turbulent flow is reduced, and the intake air can be efficiently sent to the cylinder.

In a ninth aspect of the intake manifold according to the present invention, the EGR passage is integrally formed with the intake manifold.

With this configuration, since the EGR passage is integrally formed with the intake manifold, as compared with a case where the EGR passage is prepared separately from the intake manifold, the number of components can be reduced, leading to suppression of the production cost. In addition, time and effort are not necessary for attaching and removing such a separate EGR passage, and a problem of detachment of such a separate EGR passage does not occur.

In a tenth aspect of the intake manifold according to the present invention, the EGR passage is an extension pipe connected to the EGR surge tank.

With this configuration, since the EGR passage is the extension pipe separate from the intake manifold, it is useful in a case, for example, where the EGR passage cannot be integrally formed with the intake manifold. In addition, by adjusting a shape and a length of the extension pipe, the position of the EGR inlet can be easily adjusted.

In an eleventh aspect of the intake manifold according to the present invention, an EGR surge tank for storing the exhaust recirculation gas is integrally formed with the intake manifold.

With this configuration, unlike a case where the EGR surge tank is provided separately from the intake manifold, a connecting pipe or the like for connecting the EGR surge tank and the EGR inlet does not become unnecessarily long, thus making the intake manifold compact. In addition, since the EGR surge tank can be integrally formed with the intake manifold, a fabrication step of the EGR surge tank is unnecessary, and thus the production cost is reduced.

In a twelfth aspect of the intake manifold according to the present invention, the EGR surge tank for storing the exhaust recirculation gas is integrally formed with the intake manifold.

With this configuration, unlike a case where the EGR surge tank is prepared separately from the intake manifold, the EGR passage does not become unnecessarily long, thus making the intake manifold compact. In addition, since the EGR surge tank can be integrally formed with the intake manifold, a fabrication step of the EGR surge tank is unnecessary, and thus the production cost is reduced.

DESCRIPTION OF EMBODIMENTS

Hereinbelow, the intake manifold according to the present invention applied to an automobile engine as one example will be described with reference to the drawings.

<Overall Configuration>

Figure 1:
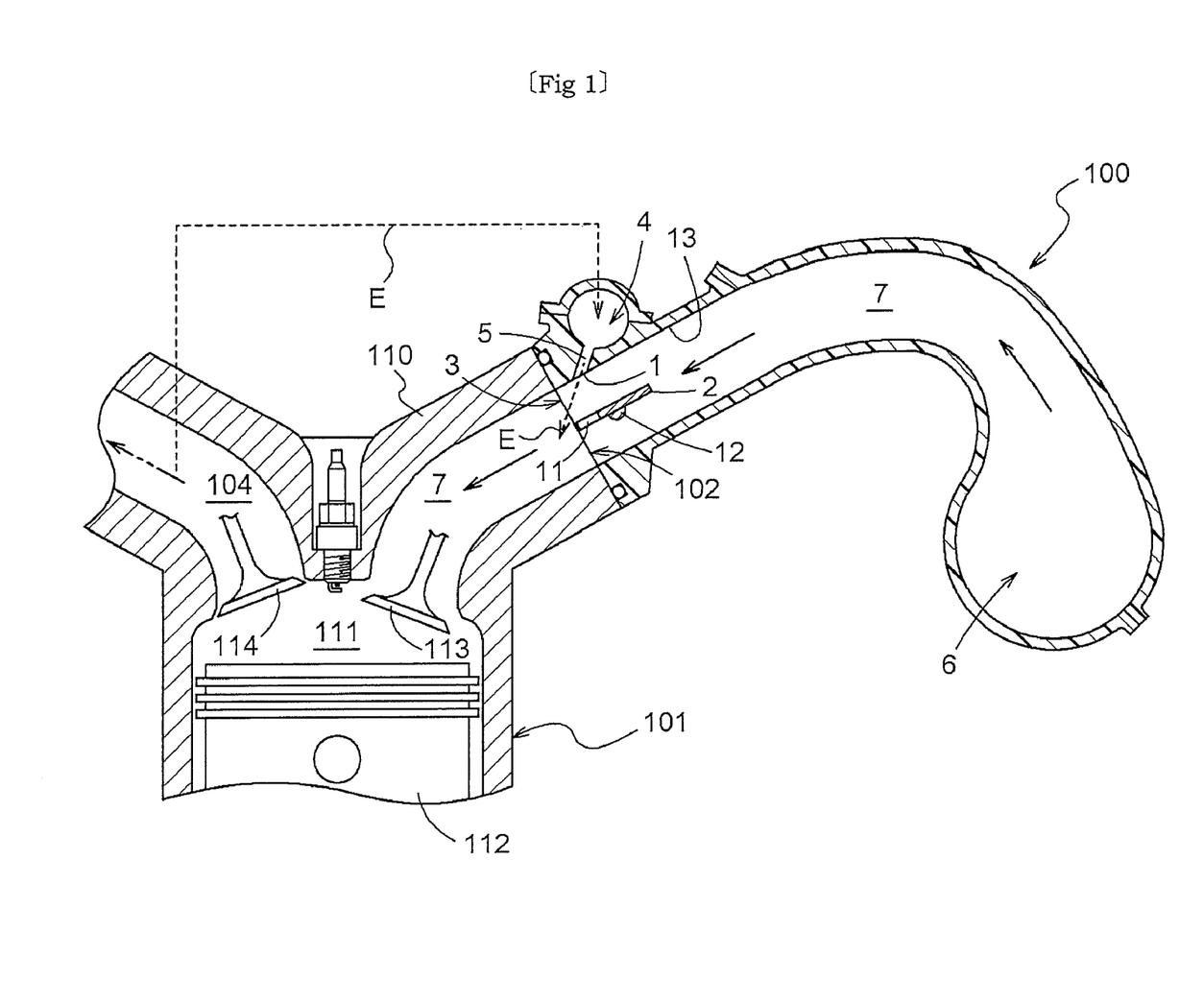
FIG. 1 is a diagram of an overall intake manifold according to the present invention.

An intracylindrical injection type engine includes one or more cylinders 101, and as shown in FIG. 1, each cylinder 101 includes a cylinder head 110, a combustion chamber 111, a piston 112, an intake valve 113, and an exhaust valve 114. As the piston 112 is lowered, incoming air (hereinafter, referred to as "intake air") passes through an intake passage 7 as intake line and flows into the combustion chamber 111. In the combustion chamber 111, fuel is injected from an injector (not shown), and the intake air is mixed with the fuel. As the piston 112 is raised, exhaust gas generated by the combustion passes through the exhaust valve 114 and an exhaust passage 104, and is discharged outside. The injector may be provided in the intake passage 7 as intake line on a cylinder head 110-side.

In this engine, as indicated with a broken line in FIG. 1, a part of the exhaust gas is recirculated from the exhaust passage 104 to the intake passage 7. A mechanism for recirculating this exhaust recirculation gas (hereinafter, referred to as "EGR gas E") includes: an on-off valve (not shown) for regulating a flow rate of the EGR gas E; and a check valve (not shown) for preventing the EGR gas E from flowing backward to the exhaust passage 104. The flow rate of the EGR gas E is adjusted in accordance with an operation state of the engine. It should be noted that the mechanism for recirculating the EGR gas E is a well-known technique, and thus a detailed description is omitted here.

As shown in FIG. 1, an intake manifold 100 has a surge tank 6. By opening and closing of a throttle valve (not shown) provided upstream of the intake manifold 100 in an intake direction, an intake volume is adjusted, and the adjusted intake air flows into the surge tank 6 through a suction opening (not shown). Of the intake manifold 100, an outlet port 3 most downstream in the intake direction is connected to an intake port 102 provided in the cylinder head 110. The intake air stored in the surge tank 6 is supplied to the combustion chamber 111 of the cylinder 101 through the intake passage 7. The outlet port 3 is formed to have a shape matching a shape of the intake port 102 so that the intake passage 7 is smoothly continuous from the intake manifold 100 to the cylinder head 110.

The intake manifold 100 includes: an EGR surge tank 4 for storing the EGR gas E; an EGR inlet 1 for discharging the EGR gas E into the intake passage 7; an EGR passage 5 for connecting the EGR surge tank 4 and the EGR inlet 1; a tumble control valve 2 for regulating a degree of opening of the intake passage 7; and a rotary motor (not shown) for rotating the tumble control valve 2. Since the intake manifold 100 is made of resin, even those having a plurality of components can be easily fabricated by injection molding. As described above, since processing of the assembly portion of the tumble control valve 2, the EGR inlet 1 and the like is facilitated, a production cost can be suppressed as compared with the case where the EGR inlet 1 and the tumble control valve 2 are provided in the metallic cylinder head 110. In addition, since assembly of the tumble control valve 2 is facilitated, assembly accuracy is enhanced, which in turn enhances operating accuracy of the tumble control valve 2.

The surge tank 6 and the EGR surge tank 4 are integrally formed with the intake manifold 100. Therefore, unlike a case where the EGR surge tank 4 is separately provided, a connecting pipe or the like for connecting the EGR surge tank 4 and the EGR inlet 1 is unnecessary, making portions around the intake manifold compact. In addition, a fabrication step of the EGR surge tank 4 is unnecessary, and thus the production cost is reduced.

As shown in FIG. 1, the EGR passage 5 is inclined relative to the intake passage 7. With this configuration, the EGR gas E is discharged from the EGR inlet 1 toward the intake port 102, and the EGR gas E is carried about by an intake air stream flowing through the intake passage 7 and easily reaches the cylinder 101 (see FIG. 1). In addition, since the EGR inlet 1 and the EGR surge tank 4 are arranged perpendicularly above the intake passage 7, exhaust condensate or the like does not enter the EGR inlet 1, and the EGR passage 5 is prevented from being blocked.

Figure 2:
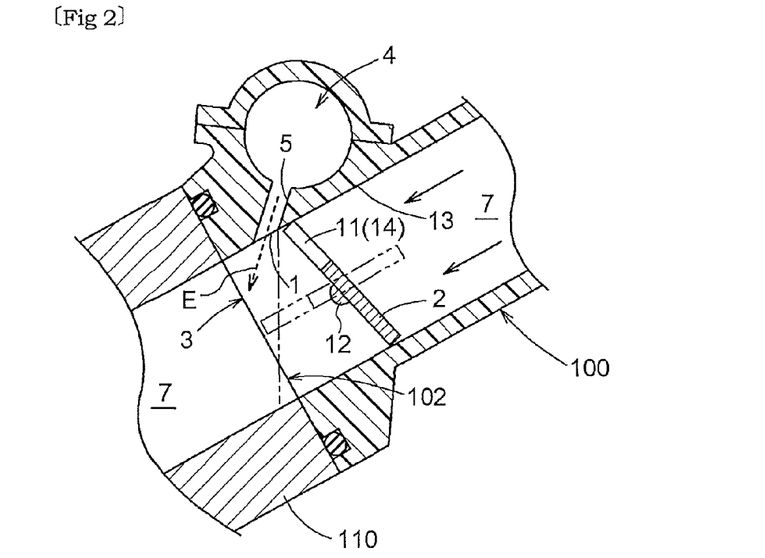
FIG. 2 is a cross-sectional view of a portion around an intake port of the intake manifold.
Figure 3:
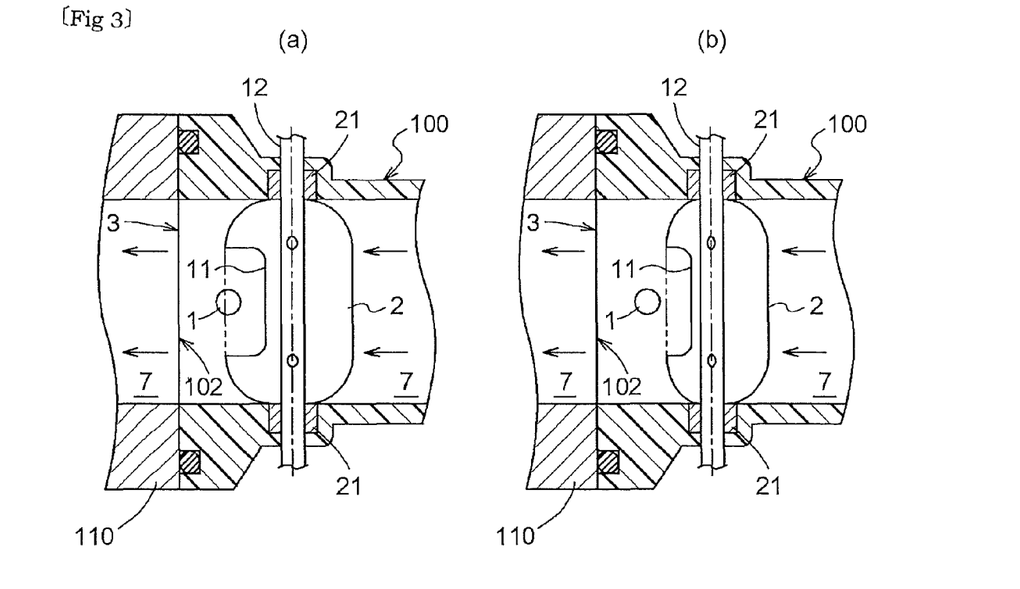
FIG. 3 is a horizontal projection of the portion around the intake port of the intake manifold shown in FIG. 2, in which: (a) shows a state in which a tumble control valve is in an open position, and (b) shows a state in a close position.

As shown in FIG. 3, a shaft 12 as rotational axis of the tumble control valve 2 is mounted in the intake manifold 100 through a bearing 21, and the tumble control valve 2 is rotatable by rotary drive of the rotary motor and switchable between an open position and a close position. As shown in FIGS. 1-3, the tumble control valve 2 is joined to the shaft 12 with screws or the like. In addition, the tumble control valve 2 has an indentation 11 in a shape of a recess as a planar view. The rotary motor is connected to an engine control unit (not shown), and operation of the rotary motor is controlled by the engine control unit.

Though not shown, a mechanism for retaining the tumble control valve 2 in the open position and in the close position may be, for example, a valve retention mechanism utilizing an electromagnetic force, or a valve retention mechanism utilizing a contact between a projection protruding inward in a radial direction from an inner wall 13 of the intake passage 7 and the tumble control valve 2.

As shown in FIG. 2, when the tumble control valve 2 is in the open position, it is in parallel with the intake passage 7 and the intake passage 7 is fully opened. In addition, when the tumble control valve 2 is in the close position, the intake passage 7 is closed and a gap 14 is formed between the indentation 11 and an upper portion of the inner wall 13 of the intake passage 7, to thereby limit the degree of opening of the intake passage 7, and thus an intake air speed is increased. As a result, the intake air at a high speed flows into the combustion chamber 111, and generation of a tumble flow in the combustion chamber 111, as well as atomization of the fuel, is promoted, to thereby obtain a higher mixing rate of the intake air and the fuel.

<Positional Relationship of EGR Inlet and Tumble Control Valve>

FIG. 3 is a horizontal projection of a portion around the intake port 102 of the intake manifold 100 assembled to the internal combustion engine, in which: (a) shows a state in which the tumble control valve 2 is in the open position; and (b) shows a state in the close position. In the present embodiment, as shown in FIG. 3, a position and a shape of the EGR inlet 1 are set in such a manner that, when the tumble control valve 2 is in the open position, any perpendicular line extending downward from the EGR inlet 1 is out of intersection with the tumble control valve 2, and at the same time, a perpendicular line extending downward from a most upstream portion of the EGR inlet 1 in the intake direction intersects an area of the indentation. In other words, when the tumble control valve 2 is in the open position, the EGR inlet 1 and the tumble control valve 2 do not overlap each other in a horizontal projection plane, and at the same time, the most upstream portion of the EGR inlet 1 in the intake direction is located within the indentation 11 in the horizontal projection plane. In addition, the position and the shape of the EGR inlet 1 are set in such a manner that, when the tumble control valve 2 is in the close position, any perpendicular line extending downward from the EGR inlet 1 is out of intersection with the tumble control valve 2, and at the same time, a perpendicular line extending downward from the most upstream portion of the EGR inlet 1 in the intake direction is out of intersection with the area of the indentation. In other words, the EGR inlet 1 and the tumble control valve 2 do not overlap each other in the horizontal projection plane, and at the same time, the EGR inlet 1 is located downstream of the tumble control valve 2 in the intake direction and is not located within the indentation 11 in the horizontal projection plane.

By bringing the EGR inlet 1 and the tumble control valve 2 as close as possible, and approximating the tumble control valve 2 as close as possible to the outlet port 3, a decrease in the intake air speed due to a pipe resistance can be suppressed. In addition, since the EGR inlet 1 is located downstream of the tumble control valve 2 in the intake direction, carbon or the like included in the EGR gas E is prevented from attaching to the tumble control valve 2. Moreover, even if exhaust condensate is generated around the EGR inlet 1, the exhaust condensate is prevented from dropping on the tumble control valve 2.

In order to prevent blow-by gas and evaporation gas (fuel vapor) from dispersing into the atmosphere, these gases may sometimes be introduced to the intake passage. However, when these gases are exposed to the EGR gas, a deposit will be generated. If the deposit is generated upstream of the tumble control valve in the intake direction, the deposit will be attached to the tumble control valve, leading to a problem of hindering an action of the tumble control valve. With the present configuration, since the EGR inlet is located downstream in the intake direction relative to the tumble control valve, and furthermore, the EGR gas is discharged toward a cylinder side downstream in the intake direction, the problem of the deposit attaching to the tumble control valve does not occur.

In the present embodiment, the EGR inlet 1 and the tumble control valve 2 are arranged and shaped as shown in FIGS. 2 and 3, but they should not be limited to these arrangement and shapes. In other words, the position of the EGR inlet 1 relative to the indentation 11 in the horizontal projection plane may vary, depending on an inclination angle of the intake passage 7, a range and a magnitude of a rotation angle of the tumble control valve 2, or the like. However, it suffices as long as the intake manifold is configured in such a manner that, in the open position and in the close position of the tumble control valve 2, the EGR inlet 1 and the tumble control valve 2 do not overlap each other in the horizontal projection plane, and at the same time, in at least one of the open position and the close position of the tumble control valve 2, the most upstream position of the EGR inlet 1 in the intake direction is located within the indentation 11 in the horizontal projection plane. For example, also in an arrangement as shown in FIGS. 4 and 5, or an arrangement as shown in FIGS. 6 and 7, the EGR inlet 1 and the tumble control valve 2 are brought as close as possible to each other, and a similar effect to that of the present embodiment can be obtained.

Figure 4:
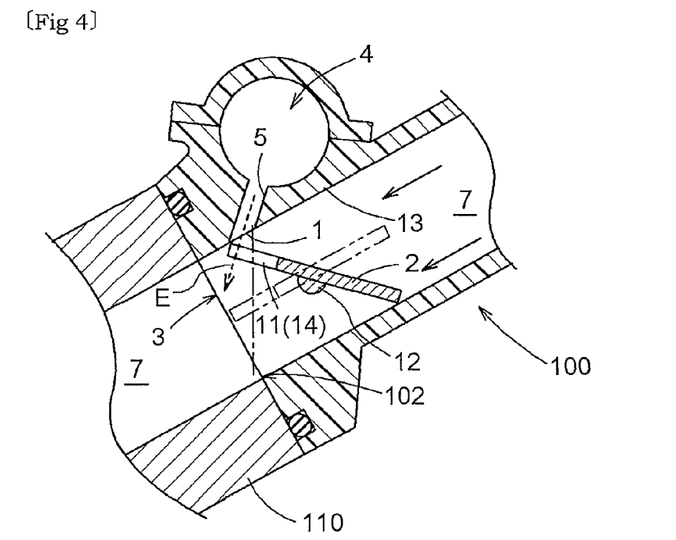
FIG. 4 is a cross-sectional view of the portion around the intake port of the intake manifold having the tumble control valve elongated in an intake direction.
Figure 5:
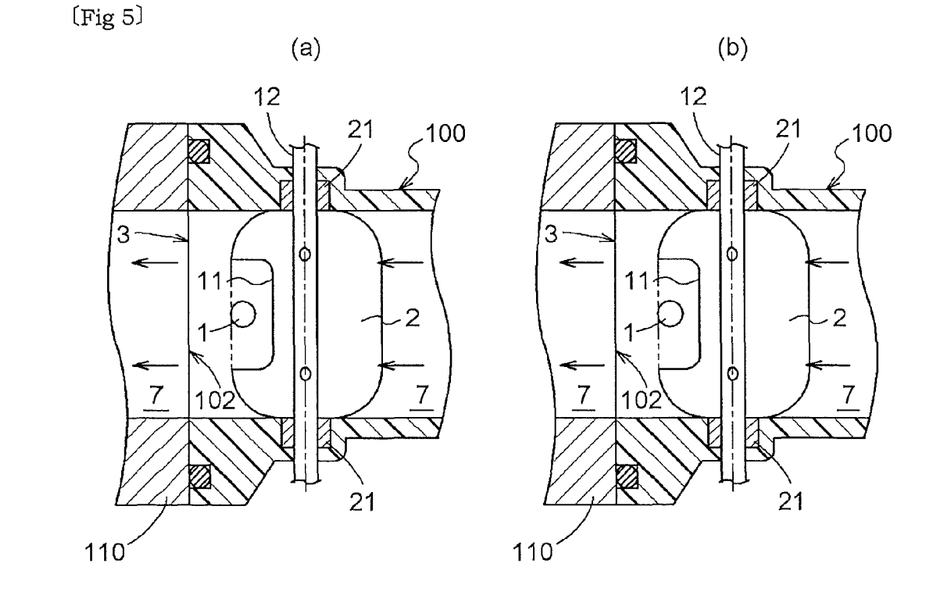
FIG. 5 is a horizontal projection of the portion around the intake port of the intake manifold shown in FIG. 4, in which: (a) shows a state in which the tumble control valve is in the open position, and (b) shows a state in the close position.

The intake manifold 100 shown in FIGS. 4 and 5 is set in such a manner that, in the open position and in the close position of the tumble control valve 2, the EGR inlet 1 and the tumble control valve 2 do not overlap each other in the horizontal projection plane, and at the same time, the most upstream position of the EGR inlet 1 in the intake direction is located within the indentation 11 in the horizontal projection plane.

Figure 6:
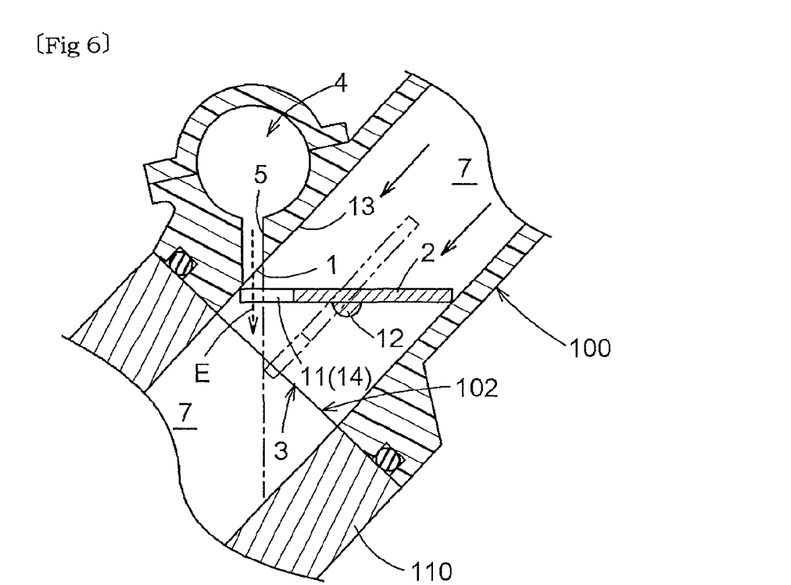
FIG. 6 is a cross-sectional view of the portion around the intake port of the intake manifold in which an inclination of an intake passage is set large.
Figure 7:
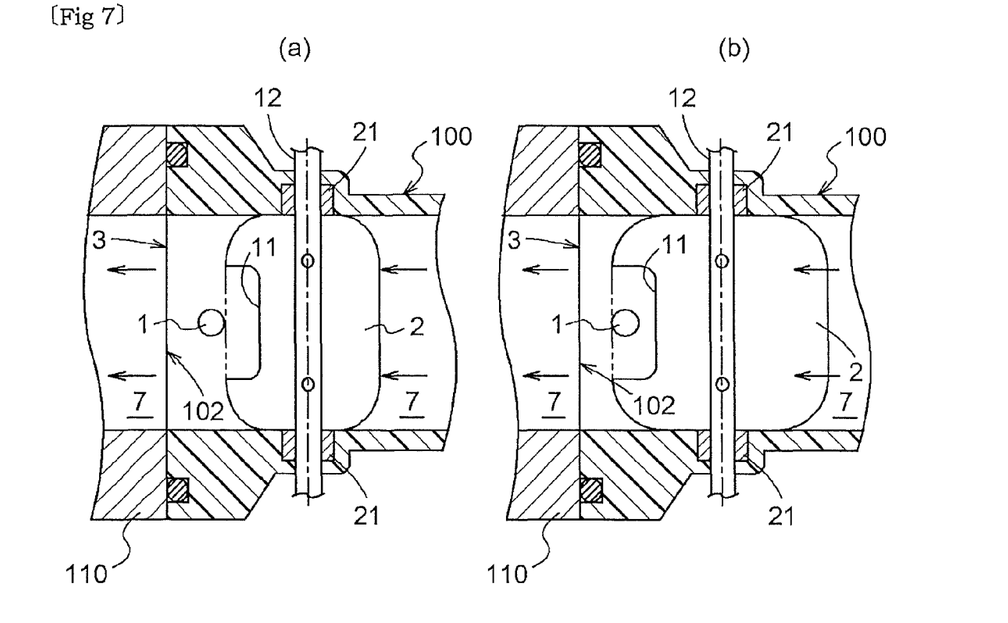
FIG. 7 is a horizontal projection of the portion around the intake port of the intake manifold shown in FIG. 6, in which: (a) shows a state in which the tumble control valve is in the open position, and (b) shows a state in the close position.

In the intake manifold 100 shown in FIGS. 6 and 7, when the tumble control valve 2 is in the open position, the EGR inlet 1 and the tumble control valve 2 do not overlap each other in the horizontal projection plane, and at the same time, the EGR inlet 1 is located downstream of the tumble control valve 2 in the intake direction and is not located within the indentation 11 in the horizontal projection plane. In addition, when the tumble control valve 2 is in the close position, the EGR inlet 1 and the tumble control valve 2 do not overlap each other in the horizontal projection plane, and at the same time, the most upstream portion of the EGR inlet 1 in the intake direction is located within indentation 11 in the horizontal projection plane.

In the present embodiment, in order to make the EGR inlet 1 and the tumble control valve 2 as close as possible, the shape of the indentation 11 is set to have a deep recess as shown in FIG. 3 and the like, but the shape should not be limited to those. Any other shape may be used, as long as the shape appropriately increases the intake air speed and as long as the EGR inlet 1 and the tumble control valve 2 can be arranged close to each other.

In the present embodiment, the surge tank 6 and the EGR surge tank 4 are integrally formed with the intake manifold 100. Alternatively, these may be formed separately from the intake manifold 100.

In the present embodiment, the engine of the intracylindrical injection type is used in which the injector is arranged inside the combustion chamber, but the position of the injector is not limited to this type. Alternatively, the injector may be arranged on the intake line on the cylinder side.

<First Optional Embodiment>

In the embodiment described above, the EGR inlet 1 and the tumble control valve 2 do not protrude from the outlet port 3. Hereinbelow, an embodiment in which the EGR inlet 1 and the tumble control valve 2 protrude from the outlet port 3 to the cylinder side will be described with reference to the drawings. For the components which are the same as those illustrated in the embodiment described above, a duplicate explanation is omitted, and such a component is designated with the same reference character.

Figure 8:
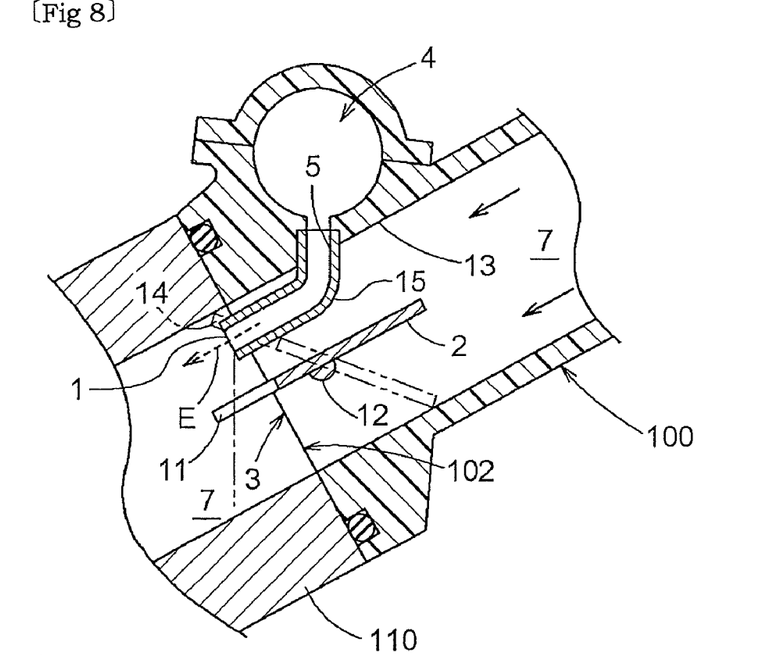
FIG. 8 is a cross-sectional view of the portion around the intake port of the intake manifold according to a first optional embodiment.

As shown in FIG. 8, the tumble control valve 2 is arranged downstream in the intake direction to a degree that the shaft 12 is just enough to be retained in the intake manifold 100. At least in the open position, the tumble control valve 2 protrudes from the outlet port 3 to the cylinder side. Accordingly, the EGR passage 5 is extended using an extension pipe 15 and the EGR inlet 1 protrudes to the cylinder side so that the EGR gas E can be discharged downstream in the intake direction relative to the tumble control valve 2, and that in the open position and in the close position of the tumble control valve 2, the EGR inlet 1 and the tumble control valve 2 do not overlap each other in the horizontal projection plane. The EGR inlet 1 may be positioned anywhere as long as it is located downstream of the tumble control valve 2 in the intake direction.

In addition, the tumble control valve 2 is provided with the indentation 11 that forms the gap 14 with the inner wall 13 of the intake passage 7 when the tumble control valve is in the close position. The indentation 11 has a dimension that increases the intake air speed and the tumble control valve 2 bridges over the extension pipe 15 with the extension pipe 15 positioned within the indentation 11, when the tumble control valve 2 is in the close position. As described above, since the extension pipe 15 can run through the gap 14, the posture change action of the tumble control valve 2 to the close position is never hindered.

Since the extension pipe 15 protrudes inward in the radial direction of the intake passage 7 and the EGR inlet 1 protrudes to an intake port 102-side, wide variety of the engine to which the intake manifold 100 is applicable can be used, without altering the shape of the intake port 102.

Further, since the EGR inlet 1 protrudes using the extension pipe 15, by adjusting a shape and a length of the extension pipe 15, the position of the EGR inlet 1 can be easily adjusted.

It should be noted that the extension pipe 15 as a whole may not protrude inward in the radial direction of the intake passage 7. For example, though not shown, a portion in the radial direction or a portion in the intake direction of the extension pipe 15 may protrude inward in the radial direction of the intake passage 7.

<Second Optional Embodiment>

In the embodiment described above, the EGR inlet 1 protrudes to the intake port 102-side using the extension pipe 15.

Figure 9:
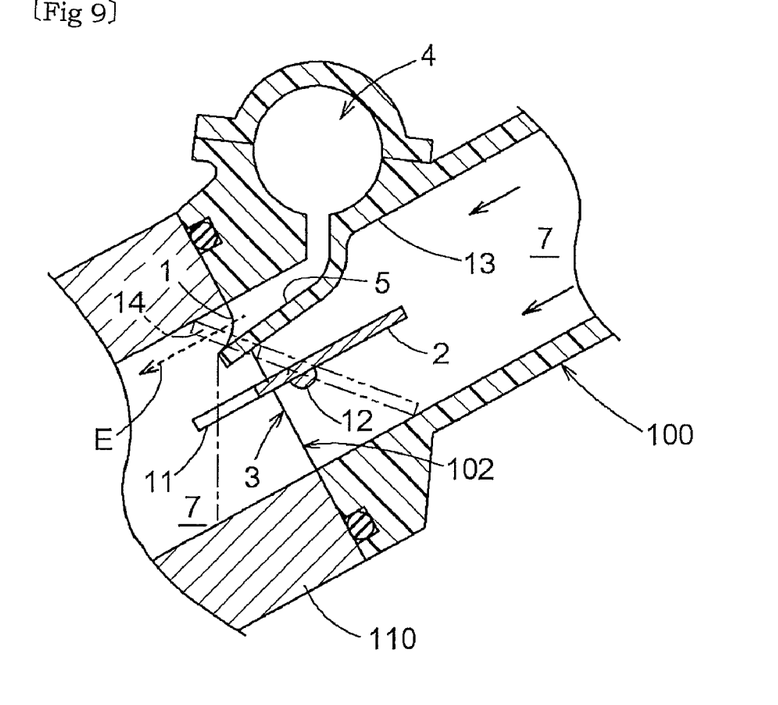
FIG. 9 is a cross-sectional view of the portion around the intake port of the intake manifold according to a second optional embodiment.

Alternatively, as shown in FIG. 9, the EGR passage 5 may be integrally formed with the intake manifold 100. With the present embodiment, time and effort for installing the extension pipe separate from the intake manifold 100 can be omitted and a problem of detachment of the extension pipe does not occur.

It should be noted that the EGR passage 5 as a whole may not protrude inward in the radial direction relative to the intake passage 7. For example, though not shown, a portion in the radial direction or a portion in the intake direction of the EGR passage 5 may protrude inward in the radial direction relative to the intake passage 7.

<Third Optional Embodiment>

In the first and second optional embodiments described above, the EGR passage 5 is arranged inward in the radial direction of the outlet port 3. Hereinbelow, an embodiment in which the EGR passage 5 does not interfere with the intake passage 7 will be described with reference to the drawings.

Figure 10:
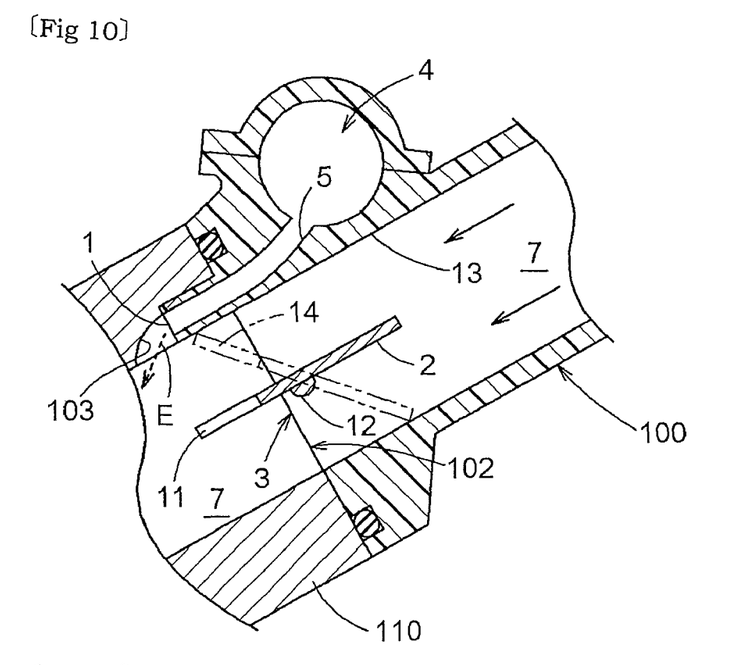
FIG. 10 is a cross-sectional view of the portion around the intake port of the intake manifold according to a third optional embodiment.

As shown in FIG. 10, at least a portion of the intake passage 7 on the cylinder head 110-side is enlarged outward in the radial direction so as to have a recess. The EGR passage 5 is formed outward in the radial direction of the outlet port 3 and arranged in parallel with the intake passage 7, and the EGR inlet 1 as an end of the EGR passage 5 is extended to a portion 103 with an expanded diameter so as to have an opening in the portion 103. In other words, the EGR passage 5 is formed outside the intake passage 7, and located outward of an area of the intake passage 7 as viewed in cross section. As described above, since the EGR passage 5 is not located inside the intake passage 7 and the EGR passage 5 and the intake passage 7 do not interfere with each other, design freedom of the tumble control valve 2 is enhanced. In addition, since nearly no irregularity is present inside the intake passage 7, the circulation of the intake air is not hindered, the generation of the turbulent flow is reduced, and the intake air can be efficiently sent to the cylinder.

Further, since the EGR passage 5 is integrally formed with the intake manifold 100, as compared with a case where the EGR passage is prepared separately from the intake manifold 100, the number of components can be reduced, leading to suppression of the production cost. In addition, time and effort are not necessary for attaching and removing such a separate EGR passage, and a problem of detachment of such a separate EGR passage does not occur.

Figure 11:
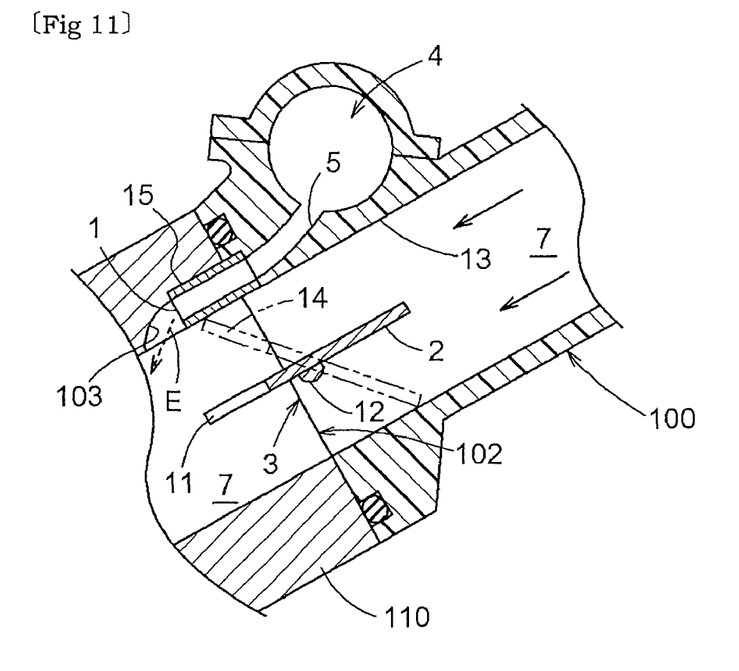
FIG. 11 is a cross-sectional view of the portion around the intake port of the intake manifold according to the third optional embodiment.

As shown in FIG. 11, a portion or the entirety of the EGR passage 5 may be formed of the extension pipe 15 separate from the intake manifold 100. An end part of the extension pipe 15 opposite to the EGR inlet 1 is connected to the EGR passage 5 and fixed to the intake manifold 100, or both the intake manifold 100 and the cylinder head 110. Since the EGR inlet 1 protrudes from the outlet port 3 to the cylinder 101-side using the extension pipe 15, by adjusting the shape and the length of the extension pipe 15, the position of the EGR inlet 1 can be easily adjusted.

INDUSTRIAL APPLICABILITY

The present invention can be applied to not only the automobile engine, but also to other types of the internal combustion engines.

REFERENCE SIGNS LIST

1 EGR inlet
2 Tumble control valve
3 Outlet port
4 EGR surge tank
5 EGR passage
7 Intake passage (intake line)
11 Indentation
13 Inner wall
14 Gap
15 Extension pipe
100 Intake manifold
101 Cylinder
102 Intake port
E EGR gas (exhaust recirculation gas)
orizontal projection plane.

The invention claimed is:

1. An intake manifold which is made of resin and configured to be connected to an intake port of a cylinder of an internal combustion engine, the intake manifold comprising:
    an EGR inlet for discharging exhaust recirculation gas toward a cylinder side; and
    a tumble control valve which is switchable between an open position in which an intake line to the cylinder is opened and a close position in which the intake line is closed, and has an indentation that forms a gap between the tumble control valve and an inner wall of the intake line when the tumble control valve is in the close position,
    the intake manifold being configured so that, when the intake manifold is assembled to the internal combustion engine, in the open position and in the close position of the tumble control valve, any perpendicular line extending downward from the EGR inlet is out of intersection with the tumble control valve, and at the same time, in at least one of the open position and the close position of the tumble control valve, a perpendicular line extending downward from a most upstream portion of the EGR inlet in an intake direction intersects an area of the indentation.

2. The intake manifold according to claim 1, further comprising an EGR surge tank for storing the exhaust recirculation gas.

3. An intake manifold which is made of resin and configured to be connected to an intake port of a cylinder of an internal combustion engine, the intake manifold comprising:
    an EGR inlet for discharging exhaust recirculation gas toward a cylinder side, the EGR inlet protruding to the cylinder side from an outlet port connected to the intake port; and
    a tumble control valve which is switchable between an open position in which an intake line to the cylinder is opened and a close position in which the intake line is closed; wherein
    the tumble control valve has an indentation that forms a gap between the tumble control valve and an inner wall of the intake line when the tumble control valve is in the close position, and
    an EGR passage that connects an EGR surge tank for storing the exhaust recirculation gas and the EGR inlet runs through the gap when the tumble control valve is in the close position.

4. The intake manifold according to claim 3, wherein
    in at least one of the open position and the close position of the tumble control valve, a portion of the tumble control valve protrudes from the outlet port to the cylinder side, and
    when the intake manifold is assembled to the internal combustion engine, in the open position and in the close position of the tumble control valve, any perpendicular line extending downward from the EGR inlet is out of intersection with the tumble control valve.

5. The intake manifold according to claim 3, wherein
    an EGR passage that connects an EGR surge tank for storing the exhaust recirculation gas and the EGR inlet is formed outward in a radial direction of the outlet port and arranged in parallel with the intake line.

6. The intake manifold according to claim 3, wherein an EGR passage that connects an EGR surge tank for storing the exhaust recirculation gas and the EGR inlet protrudes inward in a radial direction of the intake line.

7. The intake manifold according to claim 3, wherein an EGR passage that connects an EGR surge tank for storing the exhaust recirculation gas and the EGR inlet is provided outside the intake line.

8. The intake manifold according to claim 3, wherein the EGR passage is integrally formed with the intake manifold.

9. The intake manifold according to claim 3, wherein the EGR passage is an extension pipe connected to the EGR surge tank.

10. The intake manifold according to claim 3, wherein the EGR surge tank for storing the exhaust recirculation gas is integrally formed with the intake manifold.

* * * * *